(12) United States Patent
Morinaga (10) Patent No.: US 6,483,542 B1
(45) Date of Patent: Nov. 19, 2002

(54) ELECTRIC STILL CAMERA

(75) Inventor: Kenichi Morinaga, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/112,265

(22) Filed: Jul. 8, 1998

(30) Foreign Application Priority Data

Jul. 8, 1997 (JP) .............................. 9-182563

(51) Int. Cl.[7] ........................ H04N 5/222; H04N 5/225
(52) U.S. Cl. .............................. 348/333.06; 348/333.07
(58) Field of Search ................................ 348/373, 375, 348/376, 333.06, 333.07; D16/212, 229; 396/448, 373, 374, 378, 383, 419, 296; H04N 5/225

(56) References Cited

U.S. PATENT DOCUMENTS

| | | | | |
|---|---|---|---|---|
| 6,141,052 A | * | 10/2000 | Fukumitsu et al. | ......... 348/373 |
| 6,215,524 B1 | * | 4/2001 | Shiozaki | ..................... 348/333 |
| 6,342,900 B1 | * | 1/2002 | Ejima et al. | ........... 348/333.01 |
| 2001/0043273 A1 | * | 11/2001 | Herrod et al. | .............. 348/375 |

FOREIGN PATENT DOCUMENTS

| | | | | | |
|---|---|---|---|---|---|
| JP | 08009213 A | * | 1/1996 | .......... | H04N/5/225 |
| JP | 8-116476 | | 5/1996 | | |
| JP | 08139981 A | * | 5/1996 | .......... | H04N/5/225 |
| JP | 08149354 A | * | 6/1996 | .......... | H04N/5/225 |
| JP | 08223459 A | * | 9/1996 | .......... | H04N/5/225 |
| JP | 08331424 A | * | 12/1996 | .......... | H04N/5/225 |
| JP | 09009120 A | * | 1/1997 | .......... | H04N/5/225 |

* cited by examiner

Primary Examiner—Wendy R. Garber
Assistant Examiner—Lin Ye
(74) Attorney, Agent, or Firm—Lackenbach Siegel LLP (57) ABSTRACT

An electronic still camera comprises: a image pick-up section including a front surface and a image pick-up lens provided on the front surface; an image receiving section having a rear surface and a monitor provided on the rear surface, for displaying an image which has been taken; and a connecting portion for pivotally connecting between one end of the image pick-up section and one end of the image receiving section, the connecting portion including a vertical shaft such that the monitor is set being opposite to the image pick-up lens when the image receiving section is rotated backward round the vertical shaft, and the monitor is set being faced with the image pick-up lens when the image receiving section is rotated forward round the vertical shaft.

9 Claims, 6 Drawing Sheets

ELECTRIC STILL CAMERA

BACKGROUND OF INVENTION

The present invention relates to an electronic still camera, the image pick-up lens and the monitor of which can be accommodated inside.

In a conventional example of this type electronic still camera, an image pick-up section and an image receiving section are integrated with each other and formed into a camera body, and a image pick-up lens is arranged on the front surface of the camera body and a monitor for displaying an image, which has been taken by this camera, is arranged on the rear surface of the camera body. However, according to the above arrangement, the monitor and the image pick-up lens are fixed in the opposite direction to each other. Therefore, it becomes difficult for a photographer to visually check the monitor in the case of taking a picture.

In order to solve the above problems, the following arrangement is conceived. The monitor is pivotally connected to the camera body, so that the direction of the monitor can be changed.

However, according to the above conventional arrangement, the visual angle of the monitor can be only adjusted. Although the monitor can be protected when it is directed to the camera body, the image pick-up lens is exposed outside. Therefore, it is necessary to provide a protective cover for protecting the image pick-up lens. Accordingly, the number of parts is increased, which raises the production cost.

SUMMARY OF INVENTION

It is an object of the present invention to provide an electronic still camera in which the image pick-up lens and the monitor can be accommodated inside the camera so that they are not damaged, without increasing the number of parts.

In order to accomplish the above object, the present invention provides an electronic still camera comprising: a image pick-up section including a front surface and a image pick-up lens provided on the front surface; an image receiving section having a rear surface and a monitor provided on the rear surface, for displaying an image which has been taken; and means for pivotally connecting between one end of the image pick-up section and one end of the image receiving section, the connecting means including a vertical shaft such that the monitor is set being opposite to the image pick-up lens when the image receiving section is rotated backward round the vertical shaft, and the monitor is set being faced with the image pick-up lens when the image receiving section is rotated forward round the vertical shaft.

In the case of taking a picture in the above arrangement, the image receiving section is rotated backward round the vertical shaft, so that the monitor in the image receiving section can be set being opposite to the image pick-up lens in the image pick-up section. Due to the foregoing, it is possible to take a picture of a photographic object by the image pick-up lens while a photographer is visually checking an image on the monitor. In the case of not taking a picture, the image receiving section is rotated forward round the vertical shaft, so that the monitor can be set being opposed to the image pick-up lens.

In the above arrangement, when the image receiving section is rotated backward round the vertical shaft, it is possible to adjust a visual angel of the monitor. Also, when the image receiving section is rotated forward round the vertical shaft, the monitor is opposed to the image pick-up lens, and the monitor and the image pick-up lens can be accommodated between the image pick-up section and the image receiving section. Therefore, it is unnecessary to provide a protective cover for protecting the monitor and the image pick-up lens. Accordingly, it is possible to reduce the number of parts and the production cost.

Furthermore, in the electronic still camere described above, the image receiving section further includes: an image receiving main body in which the monitor is provided; an auxiliary section which is connected to one end of the image pick-up section via the vertical shaft; and a horizontal shaft protruding from the image receiving mai body, wherein the image receiving main body is pivotally engaged with the auxiliary section via the horizontal shaft such that the image receiving main body can be rotated round the horizontal shaft and slid along the auxiliary section.

In the above arrangement, when the main body of the image receiving section is rotated round the vertical and the horizontal shaft and slid along the auxiliary section, it is possible to freely adjust a visual angle of the monitor in the vertical and the transverse direction.

Still further, in the electronic still camera described above, the image receiving section further includes: an image receiving main body in which the monitor is provided; an auxiliary section which is connected to one end of the image pick-up section via the vertical shaft; a pair of horizontal shafts concentrically attached to upper ends on both sides of the image receiving main body; a guide groove extending in the vertical direction formed in the auxiliary section, and engaging with one of the horizontal shafts; a connecting piece fixed to the other horizontal shaft having a leading end; and a guide groove extending in the vertical direction formed in the other end of the image pick-up section, and engaging with the leading end of the connecting piece, wherein the leading end of a connecting piece enters the guide groove from an upper end opening of the guide groove.

In the above arrangement, when the connecting piece fixed to the other horizontal shaft is engaged with the guide groove in the image pick-up section, the main body of the image receiving section can be integrally connected with the image pick-up section. Also, when one of the horizontal shaft and the connecting piece are elevated along the guide groove, and also when the main body of the image receiving section is rotated upward and downward round both horizontal shafts, the monitor provided in the main body of the image receiving section can be set in a desired oblique or a horizontal condition. Therefore, the electronic still camera becomes handy.

Still further, in the electronic still camera described above, the other horizontal shaft is movably attached to the image receiving main body such that the other horizontal shaft can be moved in a predetermined range in the transverse direction of the other horizontal shaft, and a spring for pulling the other horizontal shaft backward is arranged in the image receiving main body.

In the above arrangement, when the connecting piece engaged with the guide groove in the image pick-up section is pulled by the spring to the main body of the image receiving section, the image pick-up section and the image receiving section can be drawn closer to each other, so that they can be integrated with each other.

Still further, the electronic still camera described above, further comprises: a click stop mechanism for temporarily stopping the rotation of the other horizontal shaft at a predetermined angle.

In the above arrangement, it is possible to fix the main body of the image receiving section at a desired oblique angle by the click stop mechanism.

Moreover, in the electronic still camera described above, the click stop mechanism includes a wheel concentrically provided on the other horizontal shaft and also includes the spring engaging with an outer circumferential surface of the wheel, a plurality of recesses are formed at regular intervals on an outer circumferential surface of the wheel in the circumferential direction, and a protruding section formed by locally bending the spring is engaged with the plurality of recesses.

In the above arrangement, the spring to draw the other horizontal shaft backward is also used for the click stop mechanism. Therefore, it is possible to reduce the number of parts, and also it is possible to reduce the production cost.

Moreover, in the electronic still camera described above, the monitor comprises a liquid crystal image plane and a transparent tablet attached onto the liquid crystal image plane.

In the above arrangement, it is possible to conduct a touch operation on the transparent tablet so as to cut away and store a necessary portion of an image displayed on the monitor, and also it is possible to synthesize or edit the image.

DETAILED DESCRIPTION OF PREFERRED EMBODIMENTS

Figure 1:
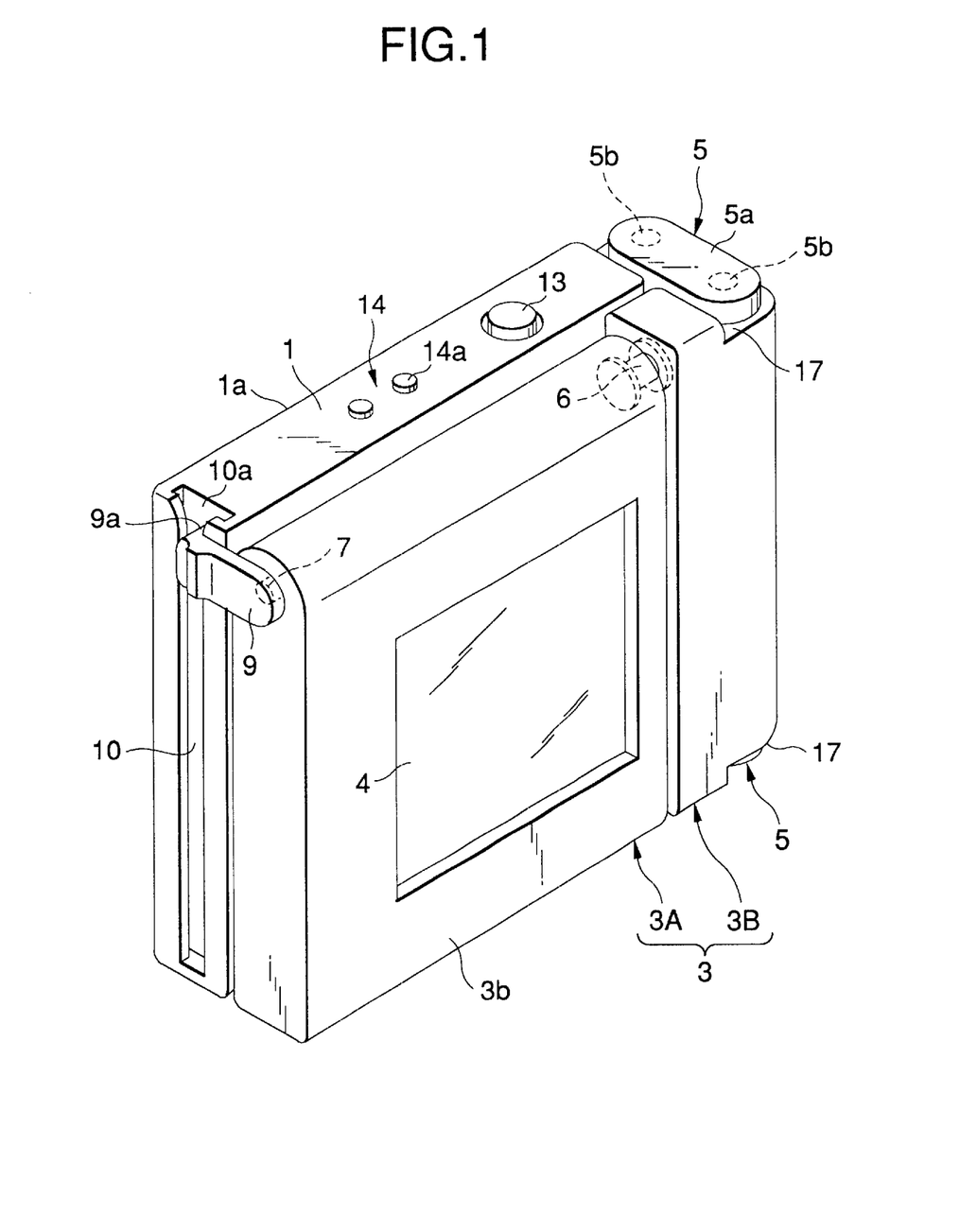
FIG. 1 is a perspective view of an electronic still camera, which is put into a state capable of taking a picture, of an embodiment of the present invention.
Figure 2:
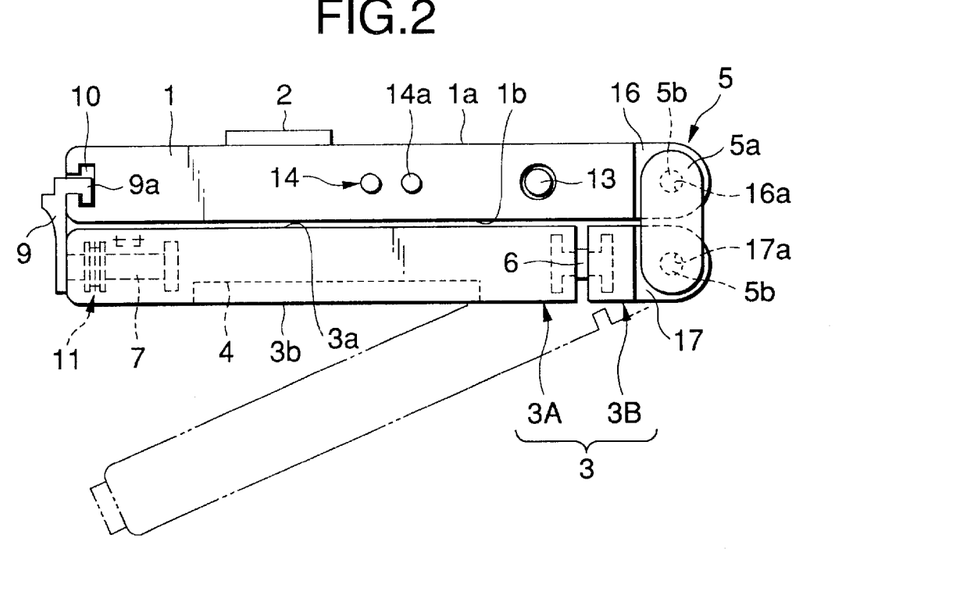
FIG. 2 is a plan view of the electronic still camera of the embodiment of the present invention.
Figure 3:
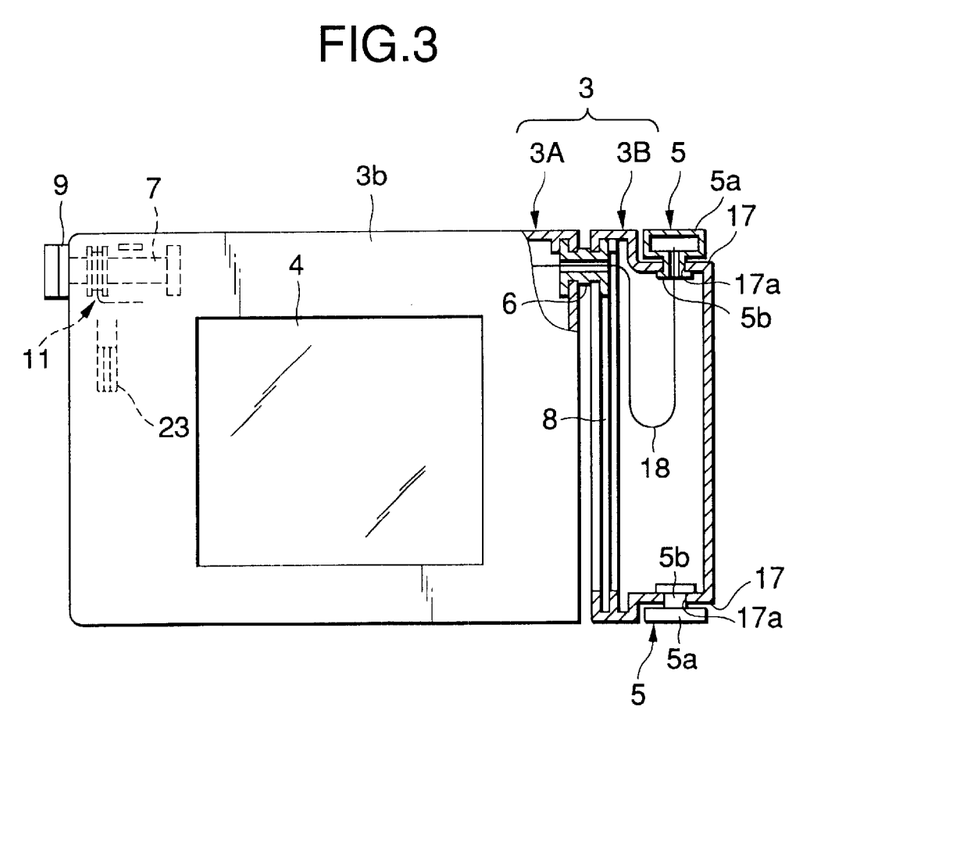
FIG. 3 is a partially cutaway rear view of the electronic still camera of the embodiment of the present invention.

Referring to the accompanying drawings, an embodiment of the present invention will be explained below. FIGS. 1 to 3 are views showing an electronic still camera of an embodiment of the present invention which is put into a state capable of taking a picture. One end of the image pick-up section 1, on the front surface 1a of which the image pick-up lens 2 is arranged, is pivotally connected with one end of the image receiving section 3, on the rear surface 3b of which the monitor 4 for displaying a photographed image is arranged, by the hinge 5. The image receiving section 3 is divided into a main body 3A of the image receiving section in which the monitor 4 is arranged, and an auxiliary section 3B connected to one end of the image pick-up section 1 via the hinge 5. At the upper ends on both sides of the main body 3A of the image receiving section, there are provided a pair of horizontal shafts 6, 7 which are arranged in the transverse direction concentrically to each other. One horizontal shaft 6 is engaged with the guide groove 8 extending in the vertical direction formed on the side of the auxiliary section 3B. A forward end 9a of the connecting piece 9 fixed to the other horizontal shaft 7 enters an upper end opening 10a of a substantially T-shaped guide groove 10 extending in the vertical direction formed on the other end side of the image pick-up section 1, so that the forward end 9a of the connecting piece 9 can be detachably engaged with the guide groove 10. There is provided a click stop mechanism 11 for temporarily stopping the rotation of the horizontal shaft 7 at a predetermined angle.

The image pick-up section 1 and the image receiving section 3 are respectively formed into a substantially same rectangular box. A control section including a microcomputer arranged inside them controls the operating section 14 for operating the image pick-up lens 2, monitor 4, memory card (not shown) for storing image information, shutter button 13 arranged on the upper surface of the image pick-up section 1, and mode changeover button 14a.

The hinge 5 includes: a pair of hinge bodies 5a which are arranged between the recessed step portions 16, 17 formed on the upper and lower surface of one end portions of the image pick-up section and the image receiving section; and a vertical shaft 5b integrally protruding from both end portions of the hinge body 5a and rotatably engaging with the through-holes 16a, 17a of the recessed step portions 16, 17. In this connection, in FIG. 3, a cable 18 passes in a through-hole of one horizontal shaft 6, upper hinge body 5a, and inside space of the vertical shaft 5b and connects an inner device of the image pick-up section 1 with an inner device of the main body 3A of the image receiving section.

Figure 4:
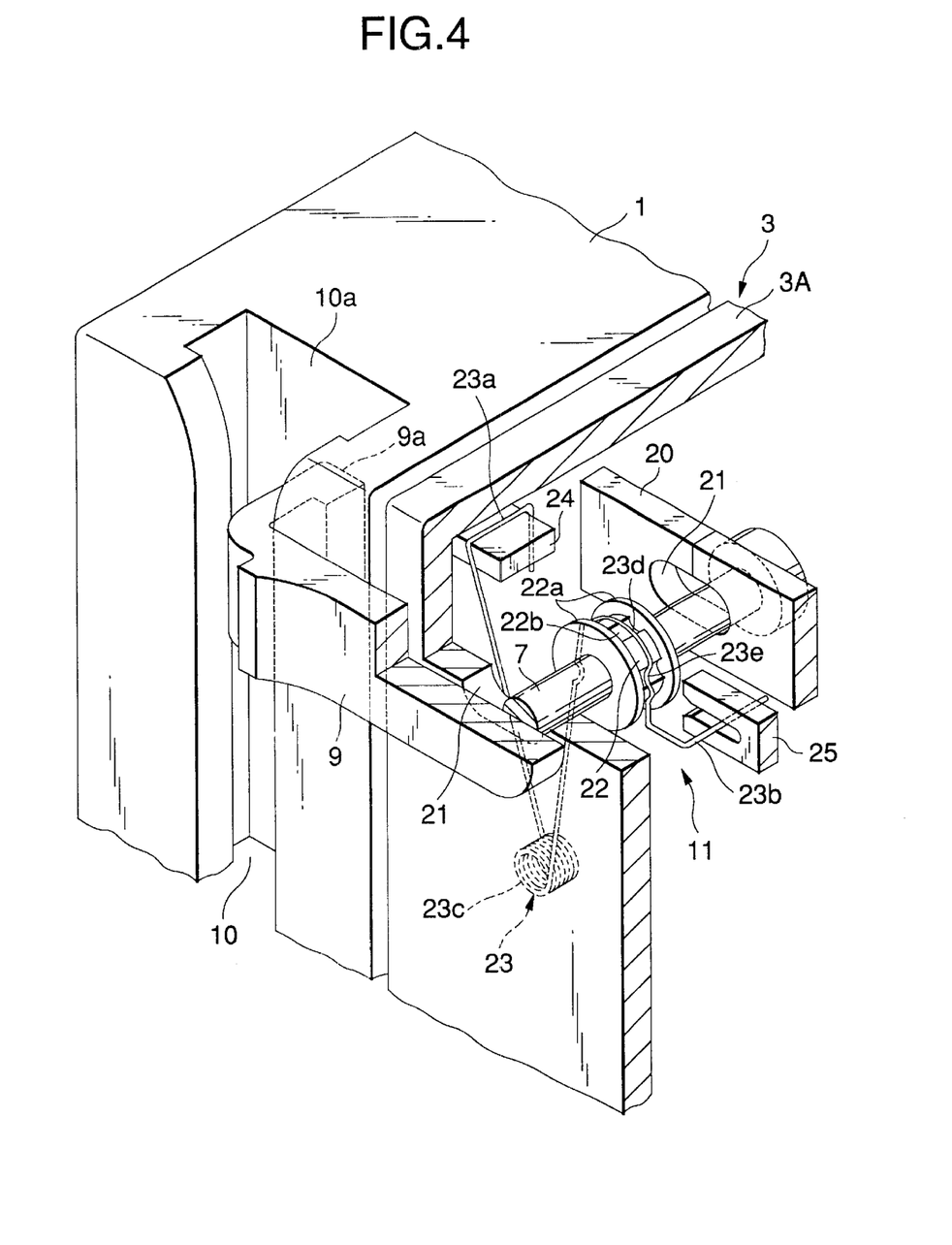
FIG. 4 is a partially cutaway perspective view of a primary portion of the electronic still camera of the embodiment of the present invention.

As shown in FIG. 4, the other horizontal shaft 7 is inserted into long holes 21 formed in the side wall of the other end of the main body 3A of the image receiving section and also formed in the bearing member 20 in the main body 3A of the image receiving section, so that the other horizontal shaft 7 can be slid in a predetermined range in the longitudinal direction in the long holes 21.

Figure 5:
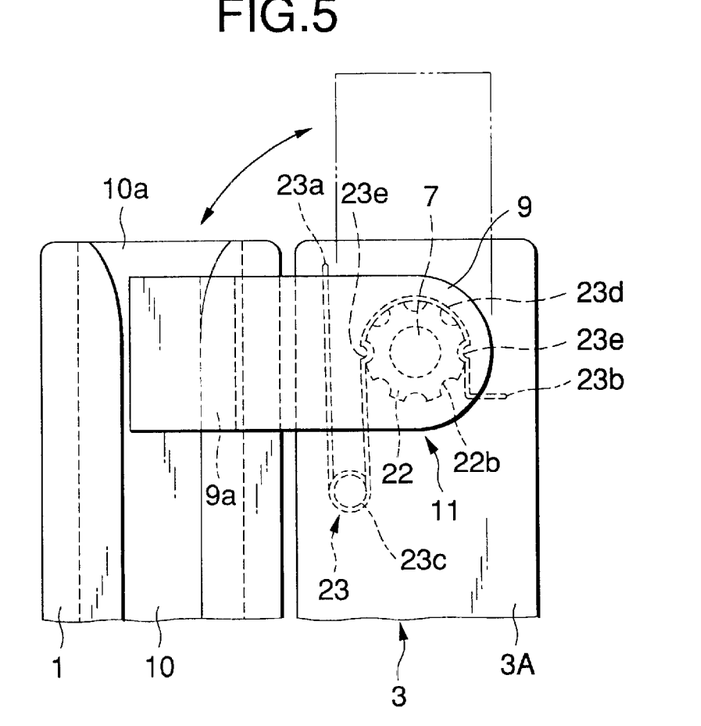
FIG. 5 is a side view of the primary portion of the electronic still camera of the embodiment of the present invention.

As shown in FIGS. 4 and 5, the connecting piece 9 is formed into a substantial L-shape. It is possible to engage the forward end 9a of the connecting piece 9 with the guide groove 10 as shown by a solid line in FIG. 5, and it is also possible to disengage the forward end 9a of the connecting piece 9 from the guide groove 10 as shown by a virtual line in FIG. 5 when it is rotated upward by an angle of 90°.

As shown in FIGS. 4 and 5, the click stop mechanism 11 includes: a wheel 22 having a flange 22a concentrically formed on the other horizontal shaft 7; and a spring 23 bent into a substantial V-shape. A plurality of recesses 22b are formed at regular intervals on an outer circumferential surface of the wheel 22 in the circumferential direction. Both end portions 23a, 23b of the spring 23 are engaged with the engaging members 24, 25 arranged in the main body 3A of the image receiving section. The central portion of the spring 23 is wound like a coil so that a force accumulating section 23c can be formed. Due to the above structure, both end portions 23a, 23b of the spring 23 are biased so that they can be extended from each other. An arc portion 23d formed by bending the rear portion of the force accumulating portion 23c is engaged with the outside of the wheel 22. A pair of protrusions 23e formed by locally bending the arc portion 23d are engaged with the plurality of recesses 22b. Therefore, the spring 23 biases the connecting piece 9 backward via the other horizontal shaft 7, and further the rotation of the other horizontal shaft 7 can be temporarily stopped at a predetermined angle.

Figure 8:
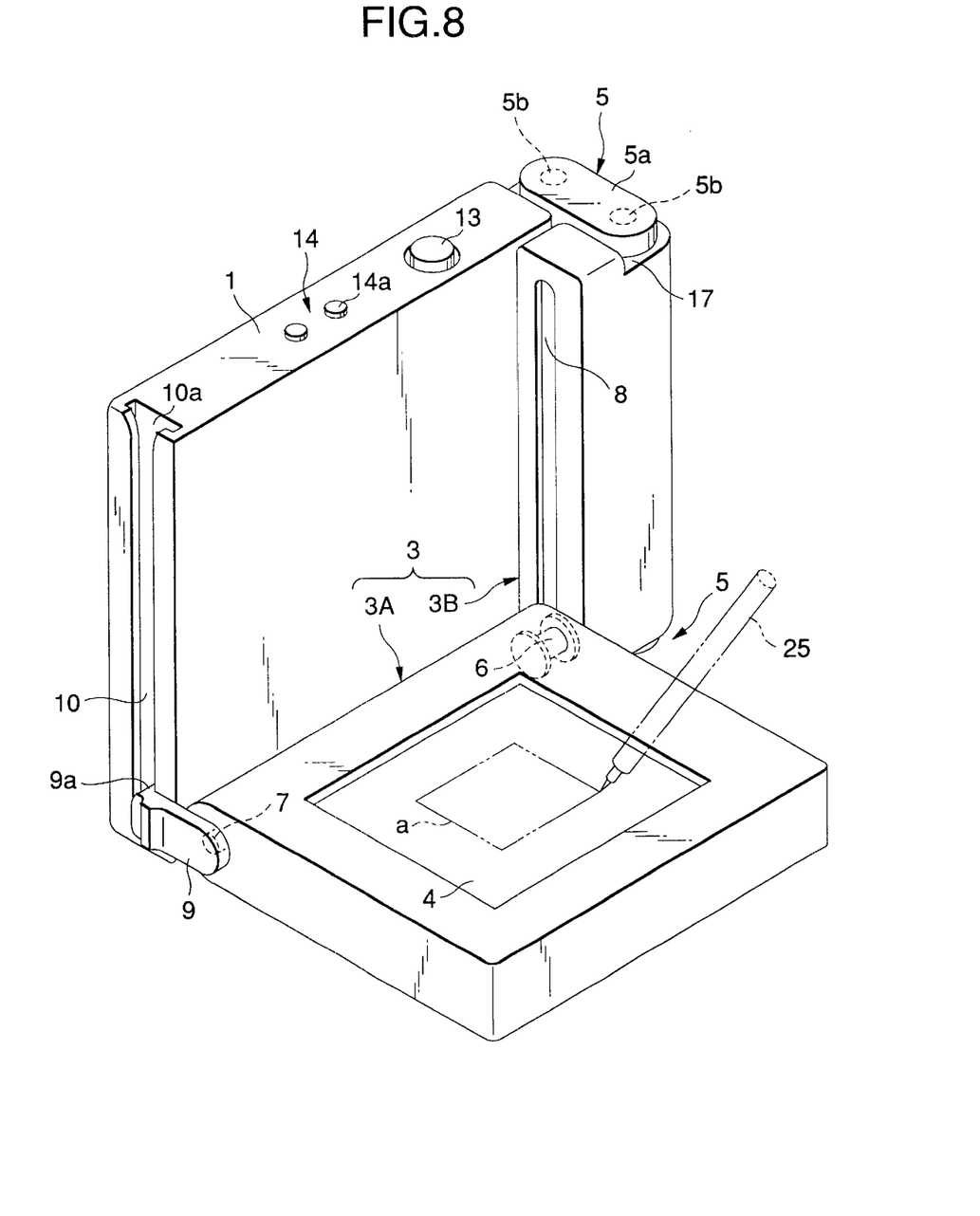
FIG. 8 is a perspective view showing a state in which the monitor is made to be horizontal upward in the electronic still camera of the embodiment of the present invention.

The monitor 4 is composed of a liquid crystal image plane. A transparent tablet is attached to the liquid crystal image plane. Therefore, it is possible to conduct a touch operation with a touch input pen 25 as shown in FIG. 8.

In the case of taking a picture in the above arrangement, as shown in FIGS. 1 to 3, the image receiving section 3 is rotated backward round the vertical shaft 5b of the hinge 5, and the front surface 3a of the image receiving section 3 is made to come close to or contacted with the rear surface 1b of the image pick-up section 1. In this way, the monitor 4 is set opposite to the image pick-up lens 2. At the same time, the connecting piece 9 is rotated downward by an angle of 90°, so that the forward end 9a of the connecting piece 9 is engaged with the guide groove 10 of the image pick-up section 1. In the above circumstances, a photographer may take a picture of a photographic object with the image pick-up lens 2 while he is visually checking an image formed on the monitor 4. In this case, when the connecting piece 9 is drawn toward the image receiving section 3 by the spring 23, the image pick-up section 1 and the image receiving section 3 can be drawn to and integrated with each other.

In the case where the photographer wants to incline the monitor 4 in the horizontal direction with respect to the image pick-up lens 2, the connecting piece 9 is rotated upward as shown by a virtual line in FIG. 1, and the forward end portion 9a of the connecting piece 9 is disengaged from the guide groove 10, and then the image receiving section 3 may be rotated by a predetermined angle round the vertical shaft 5b. Due to the above operation, the visual angle of the monitor 4 can be adjusted.

Figure 6:
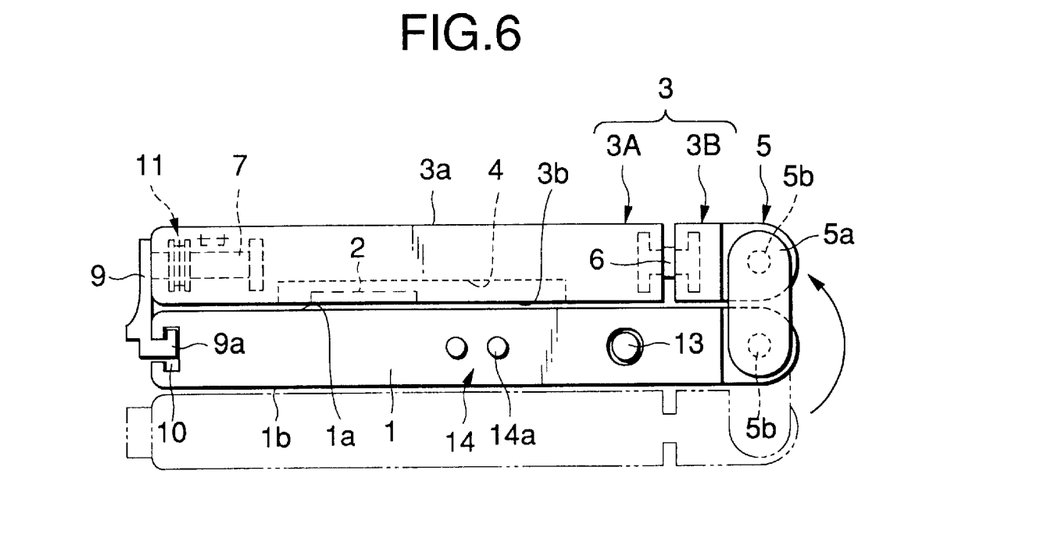
FIG. 6 is a plan view showing a state in which a monitor and a image pick-up lens of the electronic still camera of the embodiment of the present invention are accommodated.

In the case of not taking a picture, operation is conducted as follows. As shown by a solid line in FIG. 6, while the forward end portion 9a of the connecting piece 9 is disengaged from the guide groove 10, the image receiving section 3 is rotated forward round the vertical shaft 5b of the image receiving section 3, and the rear surface 3b of the image receiving section 3 is made to come close to or contacted with the front surface of the image pick-up section 1, and the monitor 4 and the image pick-up lens 2 are opposed to each other. Then the connecting piece 9 is rotated downward by an angle of 90°, so that the forward end portion 9a of the connecting piece 9 may be engaged with the guide groove 10. Due to the foregoing, the monitor 4 and the image pick-up lens 2 can be accommodated between the image pick-up section 1 and the image receiving section 3.

Figure 7:
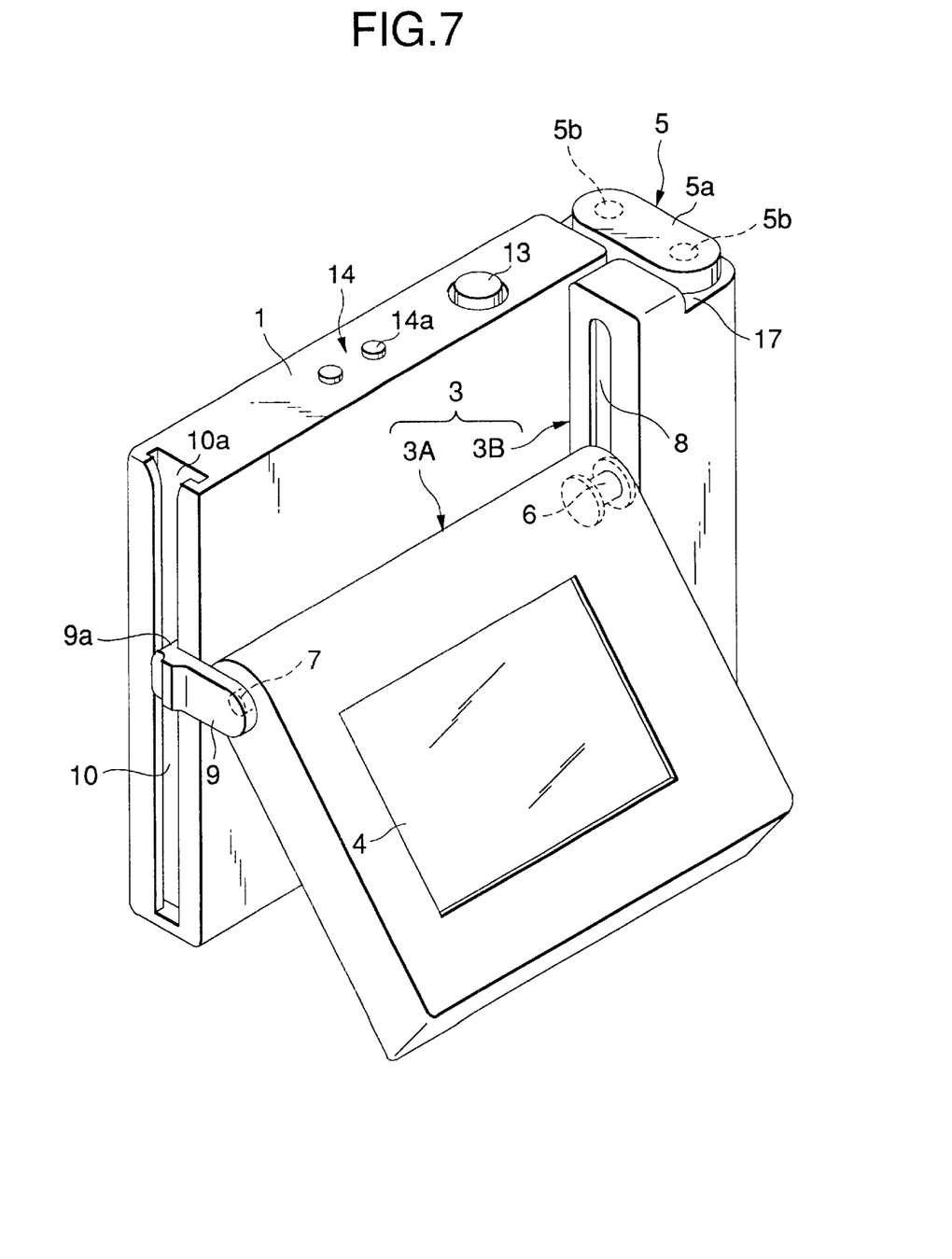
FIG. 7 is a perspective view showing a state in which the monitor is inclined upward in the electronic still camera of the embodiment of the present invention.

When a photographer wants to incline the monitor 4 upward with respect to the image pick-up lens 2 in the case of taking a picture, as shown in FIG. 7, while the forward end portion 9a of the connecting piece 9 is engaged with the guide groove 10, an upper end portion of the main body 3A of the image receiving section is pressed downward, so that one horizontal shaft 6 and the connecting piece 9 are lowered along the guide grooves 8, 10, and at the same time, a lower end portion of the main body 3A of the image receiving section is lifted upward, and the main body 3A of the image receiving section may be rotated upward round both horizontal shafts 6, 7. Due to the above operation, the main body 3A of the image receiving section can be fixed at a desired angle by the click stop mechanism 11.

In the case of conducting a touch operation on the monitor 4, as shown in FIG. 8, after the main body 3A of the image receiving section is pressed downward so that it can be made horizontal, the touch operation may be conducted on the transparent tablet attached to the monitor 4 with the touch input pen 25. Due to the foregoing, it is possible to conduct a touch operation on the transparent tablet so as to cut away and store a necessary portion of an image displayed on the monitor 4, and also it is possible to synthesize or edit the image.

According to the invention, when the image receiving section is rotated backward round the vertical shaft, the visual angle of the monitor can be adjusted. Also, when the image receiving section is rotated forward round the vertical shaft, the monitor can be opposed to the image pick-up lens, and the monitor and the image pick-up lens can be accommodated between the image pick-up section and the image receiving section. Therefore, it is unnecessary to provide a protective cover for protecting the monitor and the image pick-up lens. Accordingly, the number of parts can be reduced, and the production cost can be reduced.

Furthermore, according to the invention, when the main body of the image receiving section is rotated round the vertical and the horizontal shaft and slid along the auxiliary section, the visual angle of the monitor can be freely adjusted upward and downward and also right and left.

Still further, according to the invention, when the connecting piece fixed to the other horizontal shaft is engaged with the guide groove on the image pick-up section, the main body of the image receiving section can be connected integrally with the image pick-up section. When one horizontal shaft and the connecting piece are elevated along the guide groove and also when the main body of the image receiving section is rotated upward and downward round both horizontal shafts, the monitor provided in the main body of the image receiving section can be set in a desired oblique or horizontal condition. Therefore, the electronic still camera becomes handy.

Still further, according to the invention, when the connecting piece engaged with the guide groove in the image pick-up section is pulled by the spring to the main body of the image receiving section, the image pick-up section and the image receiving section can be drawn closer to each other, so that they can be integrated with each other.

Still further, according to the invention, it is possible to fix the main body of the image receiving section at a predetermined angle by the click stop mechanism.

Moreover, according to the invention, the spring to draw the other horizontal shaft backward is also used for the click stop mechanism. Therefore, it is possible to reduce the number of parts, and also it is possible to reduce the production cost.

Moreover, according to the invention, it is possible to conduct a touch operation on the transparent tablet so as to cut away and store a necessary portion of an image displayed on the monitor, and also it is possible to synthesize or edit the image.

What is claimed is:

1. An electronic still camera comprising:
    an image pick-up section including a front surface and an image pick-up lens provided on the front surface;
    an image receiving section having a rear surface and a monitor provided on the rear surface, for displaying an image which has been taken;
    connecting means for pivotally connecting between one end of the image pick-up section and one end of the image receiving section, the connecting means including a vertical shaft such that the monitor is positioned opposite to the image pick-up lens when the image receiving section is rotated backward about the vertical shaft, and the monitor is positioned to face the image pick-up lens when the image receiving section is rotated forward about the vertical shaft, wherein the image receiving section further includes:

an image receiving main body in which the monitor is provided;

an auxiliary section which is connected to one end of the image pick-up section via the vertical shaft; and a horizontal shaft protruding from the image receiving main body, wherein the image receiving main body is pivotally engaged with the auxiliary section via said horizontal shaft such that the image receiving main body can be rotated about said horizontal shaft and can be slid vertically along the auxiliary section.

2. The electronic still camera according to claim 1, wherein the horizontal shaft includes:

a first horizontal shaft and a second horizontal shaft, which are concentrically attached to upper ends on both sides of the image receiving body;

a first guide groove extending in the vertical direction formed in the auxiliary section, and engaging with the first horizontal shaft;

a connecting piece fixed to the second horizontal shaft having a leading end; and a second guide groove extending in the vertical direction formed in the image pick-up section, and engaging with the leading end of the connecting piece, and wherein the leading end of a connecting piece enters the guide groove from an upper end opening of the second guide groove.

3. The electronic still camera according to claim 2, wherein the second horizontal shaft is movably attached to the image receiving body such that the second horizontal shaft can be moved in a predetermined range in the transverse direction of the second horizontal shaft, and a spring for pulling the second horizontal shaft backward is arranged in the image receiving body.

4. The electronic still camera according to claim 3, further comprising:

a click stop mechanism for temporarily stopping the rotation of the second horizontal shaft at a predetermined angle.

5. The electronic still camera according to claim 4, wherein the click stop mechanism includes a wheel concentrically provided on the second horizontal shaft and also includes the spring engaging with an outer circumferential surface of the wheel, a plurality of recesses are formed at regular intervals on an outer circumferential surface of the wheel in the circumferential direction, and a protruding section formed by locally bending the spring is engaged with a plurality of recesses.

6. The electric still camera according to claim 1, wherein the image receiving main body is rotatable until at least a right angle with respect to the auxiliary section.

7. The electronic still camera according to claim 1, wherein the monitor comprises a liquid crystal image plane and a transparent tablet attached onto the liquid crystal image plane.

8. The electronic still camera according to claim 7, wherein the liquid crystal image plane and the transparent tablet onto the liquid crystal image plane is disposed to recede from the rear surface of the image receiving section so as to receive the image pick-up lens provided on the front surface of the image pick-up section.

9. The electronic still camera according to claim 1, wherein the image pick-up section and the image receiving section are respectively formed into a substantially same rectangular box.

* * * * *